(No Model.) 3 Sheets—Sheet 3.
W. F. ALTENBAUGH.
PRESS FOR MOLDING GLASSWARE.
No. 601,491. Patented Mar. 29, 1898.
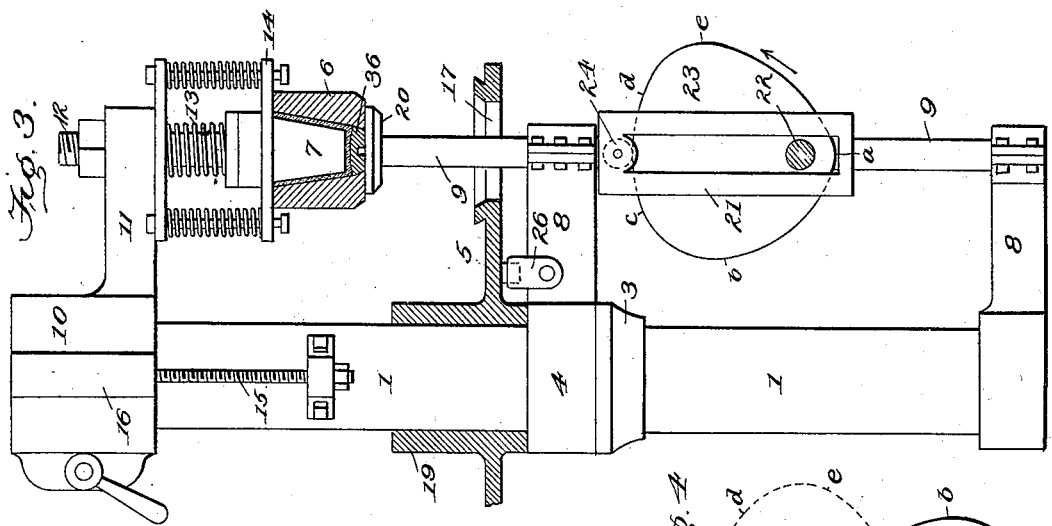
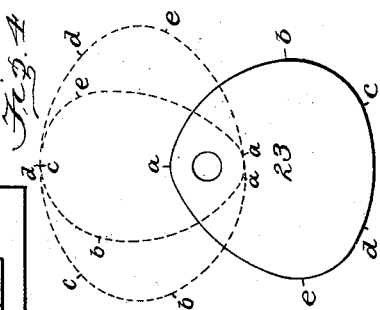
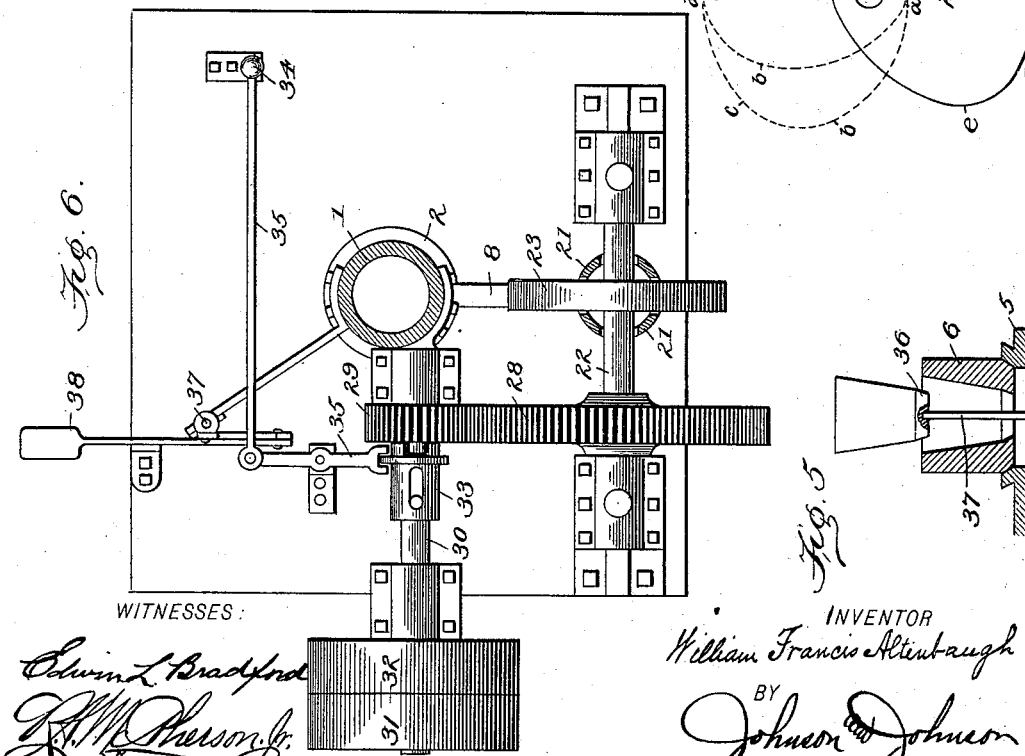
WITNESSES: 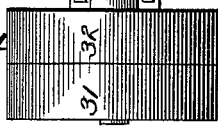
INVENTOR
William Francis Altenbaugh
BY Johnson and Johnson
ATTORNEYS.

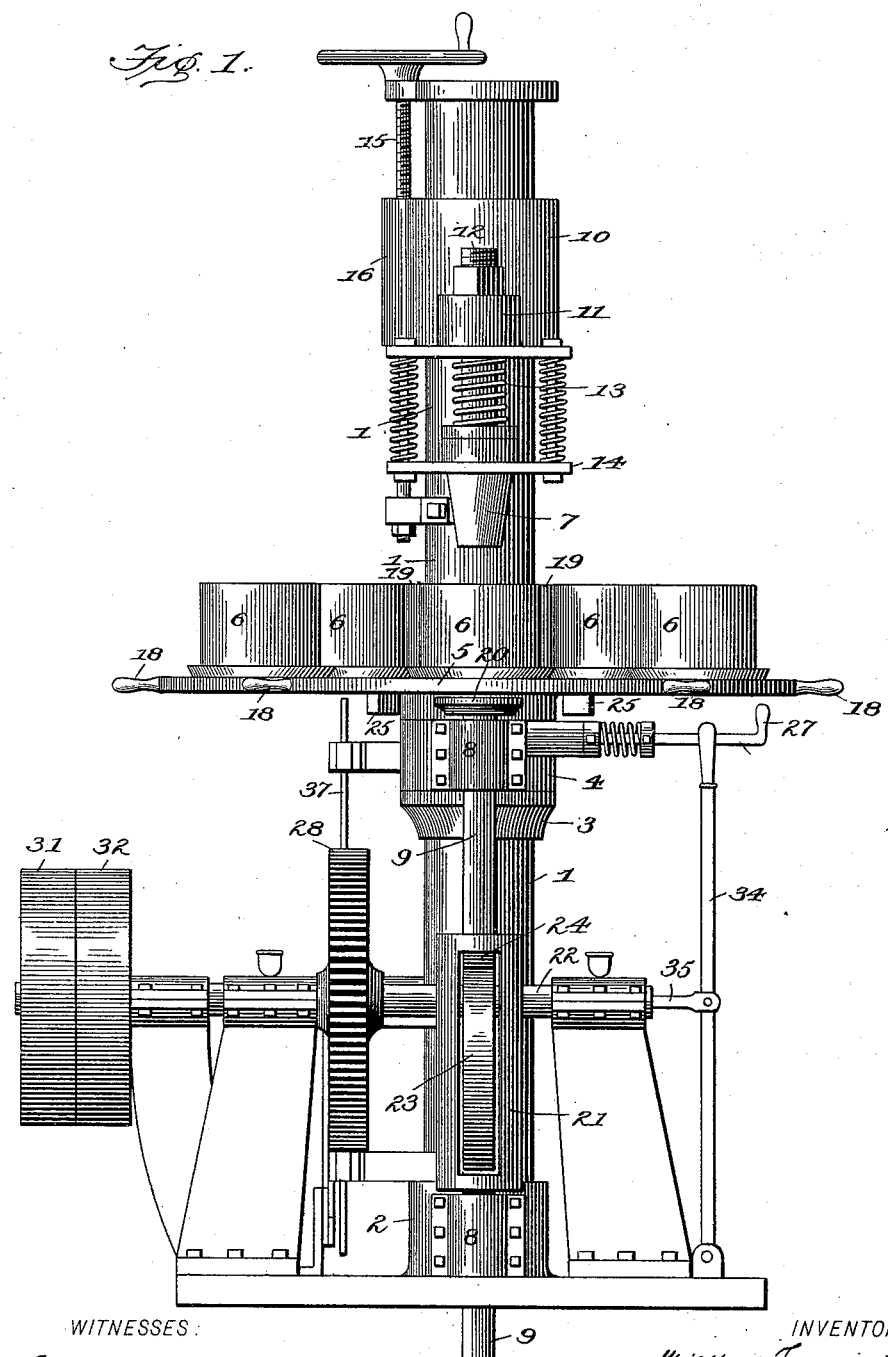

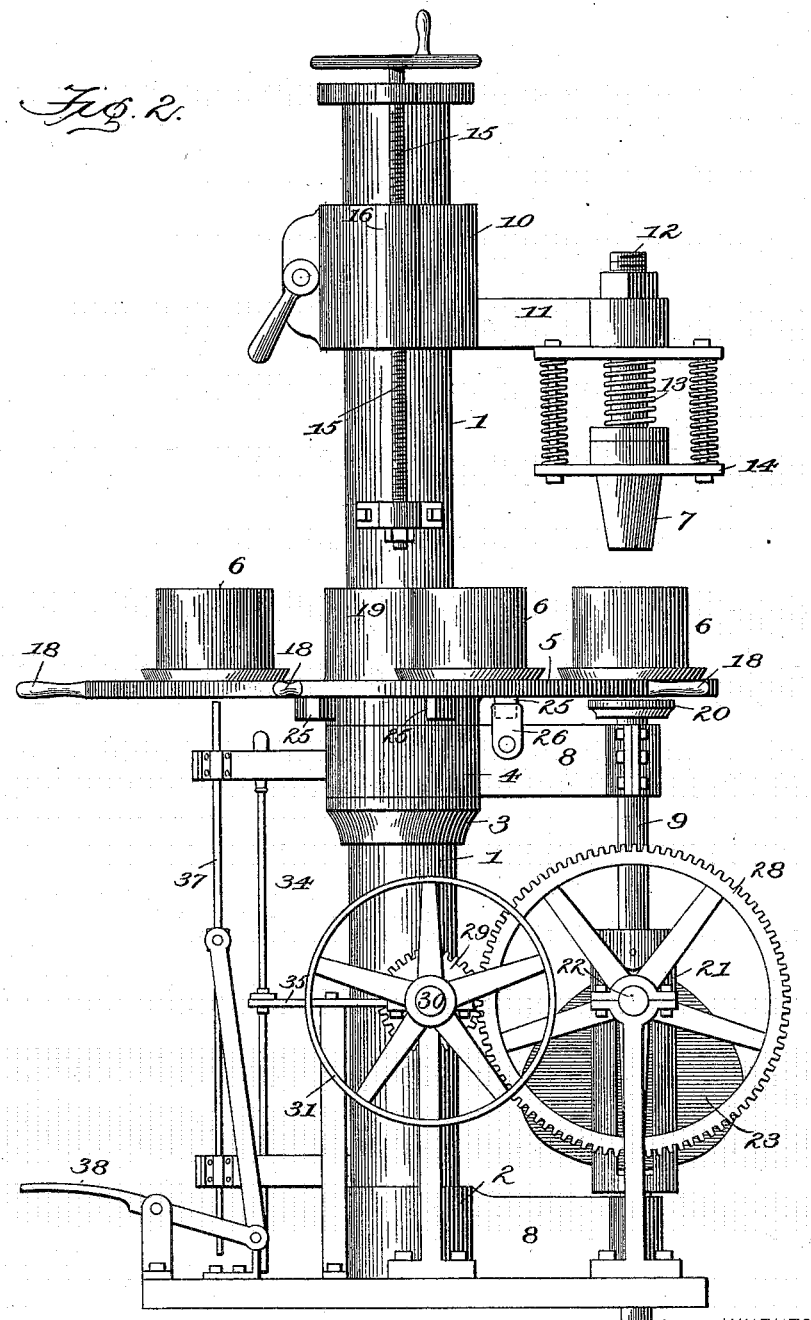

UNITED STATES PATENT OFFICE.

WILLIAM FRANCIS ALTENBAUGH, OF TIFFIN, OHIO, ASSIGNOR OF ONE-HALF TO GEORGE BEATTY, OF SAME PLACE.

PRESS FOR MOLDING GLASSWARE.

SPECIFICATION forming part of Letters Patent No. 601,491, dated March 29, 1898.

Application filed June 4, 1897. Serial No. 639,374. (No model.)

*To all whom it may concern:*

Be it known that I, WILLIAM FRANCIS ALTENBAUGH, a citizen of the United States, residing at Tiffin, in the county of Seneca and State of Ohio, have invented a new and useful Improvement in Presses for Molding Glassware, of which the following is a specification.

For forming glassware I have produced an improved construction of press in which the mold containing the glass is lifted against the pressing action of a forming-plug to mold the article; and the improved construction of the machine is designed to obtain certain advantages in operating the mold by a cam which in its rotation rapidly lifts the mold, then slows it to the limit of its ascent, and holds the mold at rest under the maximum forming pressure of the plug, whereby to give a perfect set to the formed article in the mold and to cause the gradual withdrawal of the mold from the plug, so as to avoid any suction upon and consequent distortion of the formed article. The ascent of the filled mold is comparatively rapid to bring the glass in contact with the forming-plug, while the continued ascent of the mold to form the article is slowed to give a perfect forming action of the plug in forcing the glass around it and upon the walls of the mold. In stripping the molded article from the plug the mold commences slowly to descend for a short distance, so that air can enter quickly around the plug in the molded article, and thereby avoid sucking action of the plug upon the formed article, which would tend to distort it; but immediately following this gradual separation the mold quickly descends to its seat in the table. For the attainment of these results the cam is formed and its shaft is geared for a moderately-slow rotation. A column supports a rotating mold-carrying table and the working parts of the press, while a simple form of stop device controls the rotation of the table. The attendant rotates the table by hand and removes the article from the mold by a treadle-actuated lifter while another article is being molded.

To better explain the improvements, reference is made to the accompanying drawings, in which—

Figure 1 represents a front elevation of my improved press for molding glass articles. Fig. 2 is a side elevation of the same. Fig. 3 is a sectional view of so much of the machine as illustrates the lifted position of the mold and its relation to the plug in forming the article. Fig. 4 shows the cam in full and in dotted lines in the different positions in its action to lift the mold, to hold it at rest, and to complete the pressing of the article. Fig. 5 shows the tumbler lifted from the mold, and Fig. 6 is a horizontal section taken below the table to show the clutch device which controls the mold-actuating cam.

The working parts of the press are mounted upon a cast-iron column 1 of suitable height, preferably hollow, and firmly supported in a raised socket 2 of a base-casting. A collar or flange 3 on this column supports a ring-casting 4, on which is centrally seated a circular table 5, which carries the molds 6 and which rotatively presents them to an overhanging plug 7, whereby the interior of the article is formed. The ring-casting and the base-socket have each a laterally-projecting arm 8, which support and form guides for a vertical lifting-rod 9, whereby the mold is lifted from the table to present the glass in the mold to the forming-plug, the ring and socket casting arms for this purpose forming boxes to permit the mounting of the rod. A ring-casting 10 is adjustably secured to the column above the table, and in an arm 11 carries the forming-plug depending in alinement with the mold-lifting piston-rod. The forming-plug is fitted by a stem 12 in a guide-bearing in said arm and is adapted by a spring 13 on said stem to allow the plug to yield to the upward pressure of the mold in forming the glass article therein. The plug has the usual spring-connected depending plate 14, used with the plunger and mold of a glass-press, whereby the plate serves as a cover to the mold in pressing, and the plug by its screw-stem may be adjusted vertically in its relation to the spring-plate.

The ring-casting 10 is formed as a split-clamp whereby to secure it upon the column, while a screw-stem 15, secured to the column, passes through a thread part 16 of the ring-casting and serves to adjust it vertically to give the proper relation of the plug to the pressing movement of the mold and to suit the size of the article to be pressed. The table has openings 17 concentrically arranged and formed to properly seat the molds, and the table has handles 18 by which it is turned to present the molds to the forming-plug. The ring-casting 4 and the table-sleeve 19, Fig. 3, give a steady seating and support for the table. For lifting the mold the guide-rod has a lifting-head 20, which is caused to rise and fall through the table-openings 17, and the rotation of the table is governed to bring the molds thereon in alinement with the lifting-rod and the forming-plug, as I shall presently state.

An important feature which forms part of my invention is the provision for operating and controlling the movements of the mold-lifter in the operation of pressing the article, and this feature is the employment and coöperation of a rotating cam, whereby certain new and advantageous results are obtained in press-molding glassware. The lifting-rod has an enlarged part 21, which has vertical slots, Fig. 6, formed therein at right angles to each other, making the rod open on four sides. A shaft 22 passes through these slots and is mounted in suitable supports of the base-casting. A cam 23 on this shaft is caused to rotate within the slot and to act upon and lift the lifting-rod to raise the mold over the forming-plug and to allow the mold to descend with the molded article. To lessen friction and avoid lateral strain on the lfiting-rod, it has a small roll 24 at the upper end of the slot on which the cam acts.

In Fig. 4 I have shown the cam of approximately heart shape in the three positions it acts to lift and hold the mold with the glass therein in contact with the plug under pressure, and looking at this figure the full form of the cam is seen in the position when the lifting-rod is at its lowest point, as seen in Figs. 1 and 2, and the table is at rest to receive the glass in the mold.

The mold having been filled with molten glass and standing in alinement with the plug, the cam-shaft is started, causing that part of the cam which extends from the lowest part $a$ of its projection from the shaft to the point $b$ to rapidly lift the piston-rod and the mold which it engages. This point of elevation brings the glass in the mold in contact with the plug, and the cam moving from $b$ to $c$ causes a less rapid ascent of the mold and gives it the full and complete pressure upon the plug, thereby forming the tumbler within the mold, as shown in Fig. 3. This brings upward the point of the greatest projection of the cam from its shaft and the mold to the limit of its ascent. From the point $c$ to the point $d$ the cam is concentric with a circle struck from the axis of the shaft and therefore gives no movement to the mold either up or down, and the object of this non-action is to give the time or rest necessary to allow the formed glass article to set perfectly under the pressure of the plug. This non-acting part of the cam between $c$ and $d$ is about one-third of its surface and is diametrically located in relation to that part $a$ of the cam of least projection. In the ascent of the mold it is allowed to yield slightly by the spring 13 to permit the surplus glass to distribute uniformly through the article being formed. This cam movement as applied for projecting a mold filled with molten glass over a plug which presses and forms the glass into a tumbler within the mold forms a combination of mold, forming-plug, and rotating cam which is advantageous in the results I have stated in forming the tumbler and releasing the forming-plug from the tumbler. That part of the cam from $d$ to $e$ is formed to allow the gradual descent of the mold from the plug, so as to admit air into the molded article and thereby cause the complete separation of the glass from the plug and prevent the tendency of the withdrawing action of the mold from sucking the formed article out of shape. In completing the revolution of the cam its surface from $e$ to $a$ is formed to cause the descent of the mold rapidly to carry it free of the plug and place it upon its seat on the table from which it was lifted, thus bringing the cam to the starting-point $a$, at which its shaft is disengaged from the driving power, and the lifting-head 20 will rest at its lowest point beneath the table. In operating the mold as stated it will be noticed that the cam acts by successive steps in completing a revolution to effect the ascent and the descent of the mold and that the rotation of the cam is controlled by the clutch device when it is desired to start and stop the cam. To obtain the full effective action of the cam upon the rod for lifting the mold the lifting-rod must be supported laterally against the action of the cam, and for this purpose it will be noticed that the lifting-rod is supported in fixed guides above and below the cam and thereby gives a firm and lateral support to the lifting-rod and causes it to act upon the mold with a perfectly free and steady lifting movement. Coöperating with this free and true lifting action of the mold the power-driven rotating cam is an important factor in preventing all undue pressure and strain upon the mold and its ring and which would rapidly destroy the mold. With complete rotation of the cam in elevating the mold and the yielding of the forming-plunger under the action of the mold there is a regular, certain, and determined pressure upon the mold and its ring and the duration of its service is thereby greatly increased. The table is then turned to carry the mold and its formed article from under the forming-plug and to bring the next filled mold on the table in position to repeat the action of the cam on the piston-rod and mold.

For limiting the turning movement of the table to bring the molds successively in alinement with the press molding devices I provide the under side of the table with projections 25, concentrically arranged and corresponding in number with the molds, and for engaging these projections I arrange a stop device 26 upon the arm 8 of the table-supporting casting 4, so that when said device is turned up to bring it in the path of the projections the latter will strike the stop device and arrest the further turning of the table at the point where the lifting-rod acts upon the mold. The turning of the stop down out of the path of the projections allows the table to be turned, and for this purpose the stop has a handle 27, as seen in Fig. 1.

The cam-shaft is operated by gear 28 on said shaft engaging a small gear 29, loose on a shaft 30, having a fast and a loose pulley 31 and 32 for a power-driven belt.

A clutch 33 on the power-driven shaft serves to stop and start the cam-shaft, and this clutch, by a lever 34 and connections 35, is placed under the control of the attendant. This power-driven shaft is mounted in a support on the base-casting and a bracket on the table-supporting column.

For removing the formed articles from the molds without removing the molds I provide each mold with a separate bottom 36, Figs. 3 and 5, conforming to the bottom of the article to be formed, and a stem 37, fitted in guides on the column and actuated by a treadle 38, acts through the opening 17 in the table to engage the mold-bottom and lift it and the molded article thereon above the mold, so that the article can be taken therefrom by a suitable instrument. By removing pressure from the treadle the mold-bottom resumes its position for the filling of the mold. The table can be turned either to the right or to the left in presenting the filled molds to the pressing devices. It is more convenient, however, to have the plate rotate from right to left, so that the molds with the formed articles will be carried from the forming-plug to the device for ejecting the tumbler, and thereby allow the molds to be filled as they are brought beneath the forming-plug.

Various changes in the form, proportion, and the minor details of construction may be resorted to without departing from the spirit or sacrificing any of the advantages of my invention, and for this reason I do not wish to be understood as limiting myself thereto in precise detail and construction.

I claim—

1. The combination in a press for forming glass articles, an intermittently-rotated table adapted for seating and for carrying a series of molds, an overhanging forming-plug, a lifting-rod for engaging, lifting the mold from the table and seating the mold upon the table, a rotating cam for operating said lifting-rod, said cam having a peculiar construction, that is to say, one side formed with a part which acts with a comparative rapid lifting movement and terminates in a slowed movement to the limit of ascent, the other cam side having a part which acts with a slowed initial descent to avoid suction upon the formed article, a part whereby the mold is caused to quickly descend to its seat upon the table, and a concentric part between the said sides whereby the mold is held at rest under the maximum forming pressure, and power-driven mechanism whereby the cam is rotated.

2. In a press for forming glass articles, and in combination with a forming-plug and a mold, the lifting device for the mold consisting of the piston-rod and a rotating cam having the concentric surface $c, d$ and on either side thereof having the graduated inclines, adapted in its rotation to actuate the lifting-rod and the mold with different degrees of speed in its ascent and in its descent in the way and for the purpose stated and means for automatically operating said cam with a continuous and regular rotation under a comparatively slow speed.

3. In a press for forming glass articles, the combination with the forming-plug, and a table carrying a multiple of molds, of the lifting device for the molds consisting of the lifting-rod having the vertical slot and the roll at the top of said slot, the cam 23 adapted to operate within said slot, the shaft 22, having the gear 28 and the shaft 30 having the pinion 29, a clutch on the shaft 30, and means for operating said shaft.

4. In a press for forming glass articles, a fixed column, having a rotative mold-carrying table centrally mounted thereon, and provided with concentrically-arranged openings, molds seated within said openings, a forming-plug fixed to and depending at one side of said column above the table, a vertically-operating lifting-rod mounted upon said column below the table, in alinement with the forming-plug, a cam adapted to lift said rod and mold, and means for rotating said cam.

5. In a press for forming glass articles, and in combination therein, a fixed column, having a mold-carrying rotatory table mounted thereon, provided with openings concentrically arranged, and having on its under side projections corresponding in number with said openings, a forming-plug fixed to and depending at one side of said column above the table, a movable stop carried by said column, for engaging the table projections, a vertically-operating lifting-rod mounted upon said column below the table, a cam adapted to lift said rod, molds upon the table lifted by said rod and means for rotating said cam.

6. The combination, in a press for molding articles of glass, of a forming-plug, an intermittently-rotating table adapted to carry a multiple of molds, means for supporting a mold in alinement with the forming-plug, a rotating cam of approximately heart shape for operating said mold-support in the way described, and a clutch device for controlling the rotation of said cam in union with the intermittent rotation of the mold-carrying table.

7. The combination, in a press for molding articles of glass, of a spring-pressed forming-plug, a mold and means for supporting it, with a rotating cam of approximately heart shape for operating said mold-support in the way described, and a clutch device for controlling the rotation of said cam, whereby the cam is caused to operate the mold directly against a yielding forming-plug and to effect its gradual descent therefrom.

8. In a press for forming glass articles and in combination with an overhanging forming-plug, a mold, and a table for carrying said mold, a lifting-rod mounted in fixed guide-bearings for engaging, lifting the mold from the table, and seating the mold upon the table, and a rotating cam of the form described, mounted to actuate the lifting-rod between its guide-bearings, for the purpose stated.

WILLIAM FRANCIS ALTENBAUGH.

Witnesses:
J. M. HERSHBERGER,
E. C. MONTAGUE.